(12) United States Patent
Lee et al.

(10) Patent No.: US 10,535,887 B2
(45) Date of Patent: Jan. 14, 2020

(54) FUEL CELL SYSTEM

(71) Applicants: HYUNDAI MOTOR COMPANY, Seoul (KR); KIA MOTORS CORPORATION, Seoul (KR)

(72) Inventors: Nam Woo Lee, Hwaseong-si (KR); Hyuck Roul Kwon, Yongin-si (KR); Sung Wook Na, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 74 days.

(21) Appl. No.: 15/830,904

(22) Filed: Dec. 4, 2017

(65) Prior Publication Data

US 2018/0287175 A1    Oct. 4, 2018

(30) Foreign Application Priority Data

Mar. 31, 2017    (KR) .................. 10-2017-0042174

(51) Int. Cl.
*H01M 8/04746* (2016.01)
*H01M 8/04007* (2016.01)
*H01M 8/1018* (2016.01)
*H01M 8/0432* (2016.01)

(52) U.S. Cl.
CPC ... *H01M 8/04768* (2013.01); *H01M 8/04007* (2013.01); *H01M 8/04358* (2013.01); *H01M 8/1018* (2013.01); *H01M 2008/1095* (2013.01); *H01M 2250/20* (2013.01); *Y02E 60/521* (2013.01); *Y02T 10/7005* (2013.01); *Y02T 90/32* (2013.01)

(58) Field of Classification Search
CPC ............ H01M 10/663; H01M 10/625; H01M 8/04768; H01M 8/04007
See application file for complete search history.

(56) References Cited

U.S. PATENT DOCUMENTS

2008/0152976 A1*  6/2008  Uehara ............. H01M 8/04059
                                                           429/437
2016/0141680 A1   5/2016  Yamada et al.

FOREIGN PATENT DOCUMENTS

JP         5045072 B2   10/2012
KR    10-2013-0064431 A  6/2013

* cited by examiner

*Primary Examiner* — Olatunji A Godo
(74) *Attorney, Agent, or Firm* — Morgan, Lewis & Bockius LLP

(57) ABSTRACT

A fuel cell system includes: a first line provided with a fuel cell stack and allowing a coolant to be circulated therethrough; and a second line provided with an air conditioning system and connected to the first line to allow a portion of the coolant to be selectively circulated therethrough, wherein the air conditioning system includes: a first flow path including a first inlet through which first air is introduced; a second flow path including a second inlet through which second air is introduced, and one or more communication holes communicating with the first flow path; an opening and closing device independently opening and closing the second inlet and the communication holes; a cooler disposed in the first flow path and cooling the air passing through the first flow path; and a heater core disposed in the second flow path and exchanging heat between the coolant passing through the second line and the air passing through the second flow path.

20 Claims, 9 Drawing Sheets

FUEL CELL SYSTEM

CROSS-REFERENCE TO RELATED APPLICATION

This application is based on and claims the benefit of priority to Korean Patent Application No. 10-2017-0042174, filed on Mar. 31, 2017, with the Korean Intellectual Property Office, the disclosure of which is incorporated herein in its entirety by reference.

TECHNICAL FIELD

The present disclosure relates to a fuel cell system.

BACKGROUND

A fuel cell is a device that can produce electricity by converting chemical energy from a fuel into electrical energy through an electrochemical reaction within a fuel cell stack (hereinafter referred to as the "stack"), instead of converting the chemical energy from the fuel into heat through combustion. Fuel cells may not only provide power for industries, households, and vehicles, but may also be applied to power supply for small electric/electronic products, especially, portable devices.

For example, proton exchange membrane fuel cells (PEMFCs), also known as polymer electrolyte membrane fuel cells, are extensively being studied as a power source for driving vehicles. Such a PEMFC includes: a membrane electrode assembly (MEA) having catalyst electrode layers, in which an electrochemical reaction occurs, attached to both sides of an electrolyte membrane through which hydrogen ions move; gas diffusion layers (GDLs) serving to uniformly distribute reactant gases and deliver electrical energy that is generated; gaskets and coupling members for maintaining air tightness and appropriate pressure of the reactant gases and a coolant; and bipolar plates allowing the reactant gases and the coolant to move therethrough.

In the aforementioned fuel cell, a fuel, usually hydrogen, and an oxidizing agent, usually oxygen (air), are supplied to an anode and a cathode of the MEA through a flow path of the bipolar plate, respectively. Here, hydrogen is supplied to the anode (also called "fuel electrode", "hydrogen electrode", or "oxidation electrode"), and oxygen (air) is supplied to the cathode (also called "air electrode", "oxygen electrode", or "reduction electrode").

Hydrogen supplied to the anode is split into hydrogen ions (protons, H+) and electrons (e−) by a catalyst of the electrode layers provided on both sides of the electrolyte membrane, and only the protons selectively pass through the electrolyte membrane, which is a cation exchange membrane, to be delivered to the cathode, while the electrons are delivered to the cathode through the GDL and the bipolar plate, which are conductors.

In the cathode, the protons supplied through the electrolyte membrane and the electrons supplied through the bipolar plate meet and react with oxygen of the air supplied to the cathode by an air supply system to produce water. Here, the movement of the protons leads to the flow of the electrons through a wire, and thus the flow of the electrons creates electric current.

Further, a fuel cell system mounted in a vehicle is mainly made up of: a stack generating electrical energy; a fuel supply system supplying a fuel (hydrogen) to the stack; an air supply system supplying oxygen of the air as an oxidizing agent required for electrochemical reaction to the stack; and a thermal management system (TMS) removing heat of reaction from the stack out of the system and controlling the operating temperature of the stack.

As is generally known, the TMS includes a TMS line through which a coolant for cooling the stack circulates, and a radiator provided on the TMS line and dissipating heat of the coolant externally. Since the heat of reaction from the fuel cell system is relatively greater than a heating value of an internal combustion engine system, the radiator of the fuel cell system requires relatively high heat dissipation performance compared to a radiator of the internal combustion engine system.

In general, the heat dissipation performance of a radiator is proportional to a heat dissipation area. It is difficult for a conventional fuel cell system to secure a sufficient heat dissipation area of the radiator due to constraints of installation space or other installation environments. Thus, in the conventional fuel cell system, the heat dissipation performance of the radiator may be insufficient and the cooling performance of the stack may be insufficient.

SUMMARY

The present disclosure has been made to solve the above-mentioned problems occurring in the prior art while advantages achieved by the prior art are maintained intact.

An aspect of the present disclosure provides a fuel cell system having a novel structure for increasing a heat dissipation area.

According to an aspect of the present disclosure, a fuel cell system includes: a first line provided with a fuel cell stack and allowing a coolant to be circulated therethrough; and a second line provided with an air conditioning system and connected to the first line to allow at least a portion of the coolant to be selectively circulated therethrough, wherein the air conditioning system includes: a first flow path including a first inlet through which first air is introduced; a second flow path including a second inlet through which second air is introduced, and one or more communication holes communicating with the first flow path; an opening and closing device independently opening and closing the second inlet and the communication holes; a cooler disposed in the first flow path and cooling the air passing through the first flow path; and a heater core disposed in the second flow path and exchanging heat between the coolant passing through the second line and the air passing through the second flow path.

The cooler may include an evaporator exchanging heat between a refrigerant and the air passing through the first flow path.

The fuel cell system may further include a controller controlling the opening and closing device, and the controller may control the opening and closing device to open the second inlet and close the communication holes to thereby allow the coolant and the second air to be heat-exchanged by the heater core when a predetermined coolant cooling condition is satisfied.

The first flow path may further include a first outlet through which the air passing through the first flow path is discharged, the second flow path may further include a second outlet through which the air passing through the second flow path is discharged, and the opening and closing device may be provided to open and close the second outlet.

The first outlet may communicate with an interior of a vehicle, the second outlet may communicate with the outside of the vehicle, and the controller may control the opening and closing device to open the second outlet to thereby allow the second air that is heat-exchanged with the coolant to be discharged to the outside of the vehicle through the second outlet when the coolant cooling condition is satisfied.

The fuel cell system may further include an exhaust line guiding gas discharged from the stack to the outside of the vehicle, and the second outlet may communicate with the exhaust line.

The coolant cooling condition may be determined based on whether or not a temperature of the coolant is higher than or equal to a predetermined reference temperature.

The communication holes may include a first communication hole communicating with a predetermined first point of the first flow path, and a second communication hole communicating with a predetermined second point of the first flow path to be positioned on a downstream side of the second flow path in relation to the first communication hole, and the heater core may be disposed between the first communication hole and the second communication hole.

The opening and closing device may include a first opening and closing door opening and closing the first communication hole, a second opening and closing door opening and closing the second communication hole, a third opening and closing door opening and closing the second inlet, and a fourth opening and closing door opening and closing the second outlet.

The air conditioning system may further include a water injector injecting water to the heater core.

The air conditioning system may further include at least one air filter disposed in at least one of the first inlet and the second inlet.

According to another aspect of the present disclosure, a fuel cell system includes: a first line provided with a fuel cell stack and allowing a coolant to be circulated therethrough; and a second line provided with an air conditioning system and connected to the first line to allow at least a portion of the coolant to be selectively circulated therethrough, wherein the air conditioning system includes: a first flow path including an inlet through which air is introduced, and a first outlet through which the air is discharged; a second flow path including one or more communication holes communicating with the first flow path to allow the air to pass therethrough, and a second outlet through which the air is discharged; an opening and closing device independently opening and closing the communication holes and the second outlet; a cooler disposed in the first flow path and cooling the air; and a heater core disposed in the second flow path and exchanging heat between the coolant passing through the second line and the air.

The communication holes may include a first communication hole communicating with a predetermined first point of the first flow path, and a second communication hole communicating with a predetermined second point of the first flow path to be positioned on a downstream side of the second flow path in relation to the first communication hole, and the heater core may be disposed between the first communication hole and the second communication hole.

The cooler may be positioned on an upstream side of the first flow path in relation to the first point.

The opening and closing device may include a first opening and closing door opening and closing the first communication hole, a second opening and closing door opening and closing the second communication hole, and a third opening and closing door opening and closing the second outlet.

The first outlet may communicate with an interior of a vehicle, and the second outlet may communicate with the outside of the vehicle.

The fuel cell system may further include a controller controlling the opening and closing device, and the controller may control the opening and closing device to open the first communication hole and the second outlet and close the second communication hole to thereby allow the air and the coolant to be heat-exchanged by the heater core when a predetermined coolant cooling condition is satisfied.

The coolant cooling condition may be determined based on whether or not a temperature of the coolant is higher than or equal to a predetermined reference temperature.

The air conditioning system may further include a blowing fan disposed in the inlet and blowing the air in a direction toward the inside of the first flow path.

A cross-sectional area of the inlet may be gradually narrowed from the outside of the first flow path to the inside thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
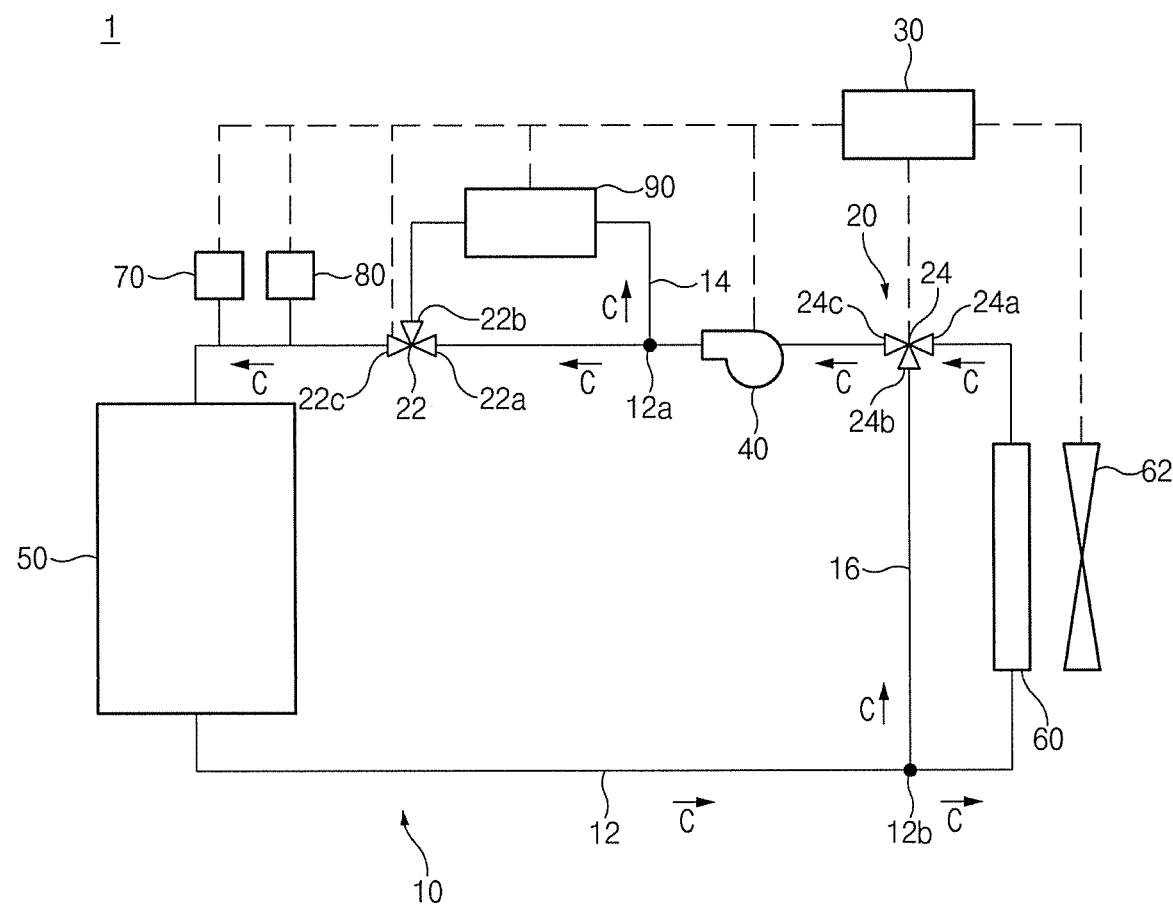
FIG. 1 illustrates the configuration of a fuel cell system according to a first exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates the configuration of a fuel cell system according to a first exemplary embodiment of the present disclosure.

Referring to FIG. 1, a fuel cell system 1 according to the first embodiment of the present disclosure includes a coolant line 10 through which a coolant C is circulated, an opening and closing valve 20 opening and closing the coolant line 10, and a controller 30 controlling the fuel cell system 1.

The controller 30 is an electric circuitry that executes instructions of software which thereby perform various functions described hereinafter.

The coolant line 10 includes, as illustrated in FIG. 1, a first line 12 through which the coolant C is circulated, a second line 14 allowing the coolant C to bypass a portion of the first line 12, and a third line 16 allowing the coolant C to bypass another portion of the first line 12.

As illustrated in FIG. 1, the first line 12 may be provided as a closed loop through which the coolant C is circulated. The first line 12 may be provided with a coolant pump 40 pumping the coolant C, a fuel cell stack (hereinafter referred to as "the stack 50") generating electricity, a radiator 60 cooling the coolant C, a temperature sensor 70 measuring a temperature of the coolant C, and a pressure sensor 80 measuring a water pressure of the coolant C.

The coolant pump 40 may be provided to pump the coolant C circulating in the first line 12 to the stack 50. The stack 50 may be cooled by the coolant C pumped by the coolant pump 40, and the coolant C may be heated by heat emitted from the stack 50. The radiator 60 may be provided to dissipate heat of the coolant C to the outside of a vehicle using a cooling fan 62, and the coolant C may be cooled by the radiator 60. The temperature sensor 70 may measure the temperature of the coolant C passing through the first line 12. The pressure sensor 80 may measure the water pressure of the coolant C passing through the first line 12. The temperature sensor 70 and the pressure sensor 80 may be disposed between a first opening and closing valve 22 and the stack 50, but the positions thereof are not limited thereto.

The second line 14 may be provided to allow the coolant C circulating through the first line 12 to bypass the first line 12 such that the coolant C passes through the second line 14. For example, as illustrated in FIG. 1, the second line 14 may be provided to allow the coolant C to bypass a portion of the first line 12 between the coolant pump 40 and the stack 50 such that the coolant C passes through the second line 14. To this end, one end of the second line 14 may be connected to a first point 12a of the first line 12 between the coolant pump 40 and the stack 50, and the other end of the second line 14 may be connected to a second port 22b of the first opening and closing valve 22 disposed between the first point 12a and the stack 50. The second line 14 may be provided with an air conditioning system 90 capable of cooling or heating the interior of the vehicle, as illustrated in FIG. 1.

In general, the air conditioning system 90 is also known as a heating, ventilation, air conditioning (HVAC) system. The air conditioning system 90 may be provided to cool or heat the interior of the vehicle using the coolant C passing through the second line 14 or a refrigerant passing through a heat pump system (not shown) of the vehicle or to assist the radiator 60 in cooling the coolant C. The air conditioning system 90 will be described in more detail later.

As illustrated in FIG. 1, the third line 16 may be provided to allow the coolant C circulating through the first line 12 to bypass the radiator 60 such that the coolant C passes through the third line 16. To this end, one end of the third line 16 may be connected to a second point 12b of the first line 12 between the stack 50 and the radiator 60, and the other end of the third line 16 may be connected to a second port 24b of a second opening and closing valve 24 disposed between the radiator 60 and the coolant pump 40.

The opening and closing valve 20 includes, as illustrated in FIG. 1, the first opening and closing valve 22 adjusting the quantity of the coolant C passing through the second line 14, and the second opening and closing valve 24 adjusting the quantity of the coolant C passing through the third line 16.

The first opening and closing valve 22 may be disposed between the first point 12a of the first line 12 and the stack 50, as illustrated in FIG. 1. The first opening and closing valve 22 includes a first port 22a connected to the first line 12 to allow the coolant C pumped by the coolant pump 40 to be introduced thereto, the second port 22b connected to the second line 14 to allow the coolant C having passed through the air conditioning system 90 to be introduced thereto, and a third port 22c connected to the first line 12 to transfer the coolant C introduced to the first port 22a and the second port 22b to the first line 12. The first opening and closing valve 22 may open and close the first to third ports 22a to 22c or adjust the degree of opening of the first to third ports 22a to 22c to thereby control the quantity of the coolant C passing through the second line 14.

The second opening and closing valve 24 may be disposed between the radiator 60 and the coolant pump 40, as illustrated in FIG. 1. The second opening and closing valve 24 includes a first port 24a connected to the first line 12 to allow the coolant C cooled by the radiator 60 to be introduced thereto, the second port 24b connected to the third line 16 to allow the coolant C passing through the third line 16 to be introduced thereto, and a third port 24c connected to the first line 12 to transfer the coolant C introduced to the first port 24a and the second port 24b to the first line 12. The second opening and closing valve 24 may open and close the first to third ports 24a to 24c or adjust the degree of opening of the first to third ports 24a to 24c to thereby control the quantity of the coolant C passing through the third line 16.

The controller 30 may control various devices provided in the fuel cell system 1 and the vehicle. A specific control method of the vehicle using the controller 30 will be described later.

Figure 2:
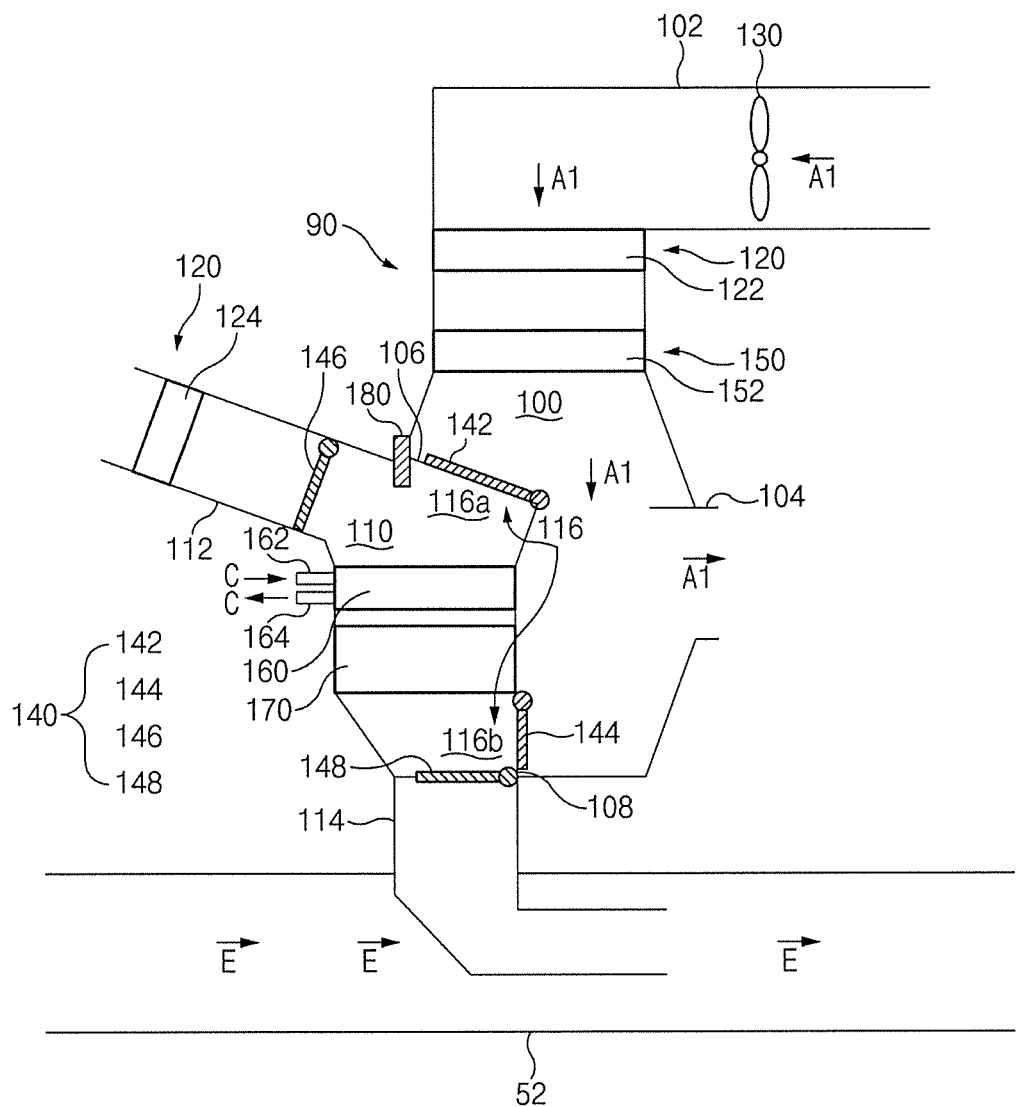
FIG. 2 illustrates a process of cooling the interior of a vehicle using an air conditioning system illustrated in FIG. 1.
Figure 3:
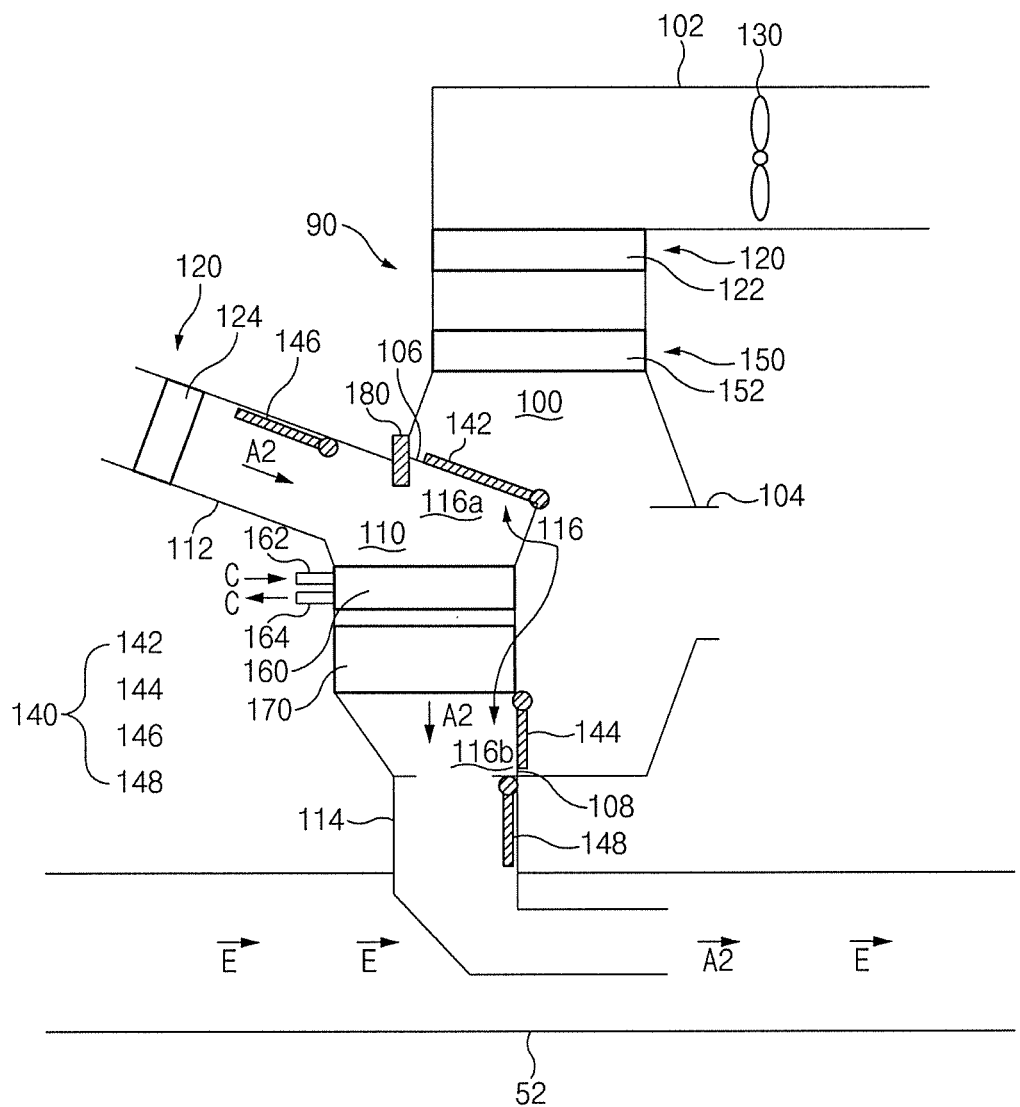
FIG. 3 illustrates a process of cooling a coolant using the air conditioning system illustrated in FIG. 1.

FIG. 2 illustrates a process of cooling the interior of a vehicle using the air conditioning system illustrated in FIG. 1, and FIG. 3 illustrates a process of cooling a coolant using the air conditioning system illustrated in FIG. 1.

The configuration of the air conditioning system 90 is not particularly limited. For example, the air conditioning system 90 includes, as illustrated in FIG. 2, a first flow path 100, a second flow path 110, an air filter 120, a blowing fan 130, an opening and closing device 140, a cooler 150, a heater core 160, a PTC heater 170, and a water injector 180.

The first flow path 100 may have a first inlet 102 and a first outlet 104, as illustrated in FIG. 2. The first flow path 100 may be provided with the blowing fan 130, a first air filter 122, and the cooler 150.

As illustrated in FIG. 2, the first inlet 102 may be provided to introduce first air A1. The first air A1 is not particularly limited. For example, the first air A1 may be air in the atmosphere. In this case, the first inlet 102 may communicate with the outside of the vehicle such that the air in the atmosphere may be introduced as the first air A1.

As illustrated in FIG. 2, the first outlet 104 may be provided to discharge the air having passed through the first flow path 100. For example, the first outlet 104 may communicate with the interior of the vehicle such that the air having passed through the first flow path 100 may be discharged into the interior of the vehicle. Here, the air having passed through the first flow path 100 refers to the air introduced to the first flow path 100 through the first inlet 102 or communication holes 116a and 116b to be described later and flowing to the first outlet 104.

The second flow path 110 may have a second inlet 112, a second outlet 114, and one or more communication holes 116, as illustrated in FIG. 3. The second flow path 110 may be provided with a second air filter 124, the heater core 160, and the PTC heater 170.

As illustrated in FIG. 3, the second inlet 112 may be provided to introduce second air A2. The second air A2 is not particularly limited. For example, the second air A2 may be air in the atmosphere. In this case, the second inlet 112 may communicate with the outside of the vehicle such that the air in the atmosphere may be introduced as the second air A2.

As illustrated in FIG. 3, the second outlet 114 may be provided to discharge the air having passed through the second flow path 110. For example, the second outlet 114 may communicate with the outside of the vehicle such that the air having passed through the second flow path 110 may be discharged to the outside of the vehicle. Here, the air having passed through the second flow path 110 refers to the air introduced to the second flow path 110 through the second inlet 112 or the communication holes 116a and 116b to be described later and flowing to the second outlet 114.

A method for communicating the second outlet 114 with the outside of the vehicle is not particularly limited. For example, as illustrated in FIG. 3, the second outlet 114 may communicate with an exhaust line 52 guiding gas (E) emitted from the stack 50 to the outside of the vehicle. Since the exhaust line 52 is in a low pressure state due to the gas (E) flowing at high speed, negative pressure may act on the second flow path 110 communicated with the exhaust line 52. Then, the air passing through the second flow path 110 may be sucked in by the negative pressure, flow into the exhaust line 52 through the second outlet 114, and be discharged, together with the gas (E) passing through the exhaust line 52, to the outside of the vehicle. Thus, the air passing through the second flow path 110 may be smoothly discharged due to the negative pressure supplied by the exhaust line 52, without the aid of the blowing fan.

Each of the communication holes 116 may be provided to communicate with the first flow path 100, as illustrated in FIG. 2. The number of communication holes is not particularly limited. For example, the communication holes include, as illustrated in FIG. 2, a first communication hole 116a communicating with a predetermined first point 106 of the first flow path 100, and a second communication hole 116b communicating with a predetermined second point 108 of the first flow path 100 to be positioned on the downstream side of the second flow path 110 in relation to the first communication hole 116a. The first air A1 or the second air A2 may be transferred from the first flow path 100 to the second flow path 110 or from the second flow path 110 to the first flow path 100 through the communication holes 116.

The air filter 120 may be provided to filter the air introduced through the inlets 102 and 112. For example, the air filter 120 includes, as illustrated in FIGS. 2 and 3, the first air filter 122 disposed in the first inlet 102 to filter the first air A1, and the second air filter 124 disposed in the second inlet 112 to filter the second air A2. Since the air filter 120 has the same structure as that of a general air filter, a detailed description thereof will be omitted.

As illustrated in FIG. 2, the blowing fan 130 may be disposed in the first flow path 100, and blow the first air A1 in a direction toward the inside of the first flow path 100. The blowing fan 130 may be disposed on the upstream side of the first flow path 100 in relation to the first air filter 122, but the position thereof is not limited thereto. Further, the blowing fan 130 may also be disposed in the second flow path 110, and blow the second air A2 in a direction toward the inside of the second flow path 110.

The opening and closing device 140 may be provided to switch the flow of the air inside the air conditioning system 90, by selectively opening and closing the communication holes 116. To this end, as illustrated in FIG. 2, the opening and closing device 140 may have a first opening and closing door 142 opening and closing the first communication hole 116a, a second opening and closing door 144 opening and closing the second communication hole 116b, a third opening and closing door 146 opening and closing the second inlet 112, and a fourth opening and closing door 148 opening and closing the second outlet 114. Since the first to fourth opening and closing doors 142, 144, 146, and 148 have the same structure as that of a general opening and closing door that is used to adjust the flow of the air, a detailed description thereof will be omitted.

The cooler 150 may be disposed in the first flow path 100 to cool the air passing through the first flow path 100. The cooler 150 may be disposed on the downstream side of the first flow path 100 in relation to the first air filter 122, but the position thereof is not limited thereto.

The structure of the cooler 150 is not particularly limited. For example, the cooler 150 includes, as illustrated in FIG. 2, an evaporator 152 exchanging heat between the refrigerant circulated by the heat pump system of the vehicle and the air passing through the first flow path 100 to cool the air passing through the first flow path 100.

As illustrated in FIG. 2, the heater core 160 may be disposed in the second flow path 110 to contact the air passing through the second flow path 110. The heater core 160 may have a coolant inlet 162 connected to the second line 14 to allow the coolant C circulating through the second line 14 to be introduced into the inside of the heater core 160, and a coolant outlet 164 connected to the second line 14 to discharge the coolant C that has been introduced into the inside of the heater core 160. The heater core 160 may exchange heat between the coolant C circulating through the second line 14 and the air passing through the second flow path 110.

As illustrated in FIG. 2, the PTC heater 170 may be disposed in the second flow path 110 to heat the air passing through the second flow path 110 using electric current supplied from a battery. The PTC heater 170 may be disposed on the downstream side of the second flow path 110 in relation to the heater core 160, but the position thereof is not limited thereto. Since the PTC heater 170 has the same structure as that of an electric heater that is typically used to heat air, a detailed description thereof will be omitted.

As illustrated in FIG. 2, the water injector 180 may be disposed in the second flow path 110 to inject water onto the outer circumferential surface of the heater core 160. The heater core 160 may exchange heat between the water injected by the water injector and the coolant C circulating through the second line 14.

Hereinafter, referring to FIG. 2, a method for cooling the interior of the vehicle using the air conditioning system 90 will be described.

When a predetermined cooling condition is satisfied, the controller 30 may control the opening and closing device 140 to close the second inlet 112, the second outlet 114, and the communication holes 116a and 116b, control the blowing fan 130 to blow the first air A1, and control the heat pump system to allow the refrigerant to pass through the evaporator 152. The cooling condition may be determined based on whether or not a temperature in the interior of the vehicle is higher than or equal to a predetermined cooling temperature, but is not limited thereto.

In addition, when the cooling condition is satisfied, the controller 30 may control the first opening and closing valve 22 to allow a predetermined minimum quantity of the coolant C to flow into the second line 14, and stop the PTC heater 170 and the water injector 180.

When the vehicle is controlled as described above, the first air A1 may be introduced to the first flow path 100 through the first inlet 102 and be then heat-exchanged with the refrigerant by the evaporator 152 to be cooled. The cooled first air A1 may be supplied to the interior of the vehicle through the first outlet 104, thereby cooling the interior of the vehicle.

Figure 4:
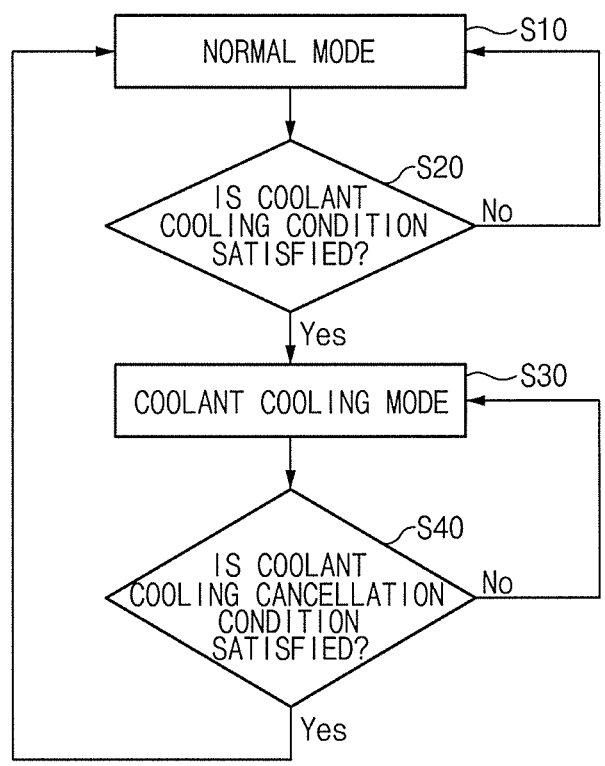
FIG. 4 illustrates a flowchart of a method for cooling a coolant using the air conditioning system illustrated in FIG. 3.

FIG. 4 illustrates a flowchart of a method for cooling a coolant using the air conditioning system illustrated in FIG. 3.

Hereinafter, referring to FIGS. 3 and 4, the method for cooling the coolant C using the air conditioning system 90 will be described.

The air conditioning system 90, which is generally used to cool and heat the interior of the vehicle, may be used to cool the coolant. The fuel cell system 1 may use the air conditioning system 90 to cool the coolant C.

Taking this into consideration, the controller 30 may control the vehicle, as illustrated in FIG. 4, to cool and heat the interior of the vehicle using the air conditioning system 90 in normal operation (normal mode) (S10), to determine whether a coolant cooling condition is satisfied (S20) and cool the coolant C using the air conditioning system 90 (coolant cooling mode) (S30) only when the coolant cooling condition is satisfied, and to determine whether a coolant cooling cancellation condition is satisfied (S40) and cool and heat the interior of the vehicle using the air conditioning system 90 when the coolant cooling cancellation condition is satisfied. The coolant cooling condition may be determined based on whether or not a temperature of the coolant C measured by the temperature sensor 70 is higher than or equal to a predetermined reference temperature, but is not limited thereto. For example, the coolant cooling condition may be determined based on whether or not the output of the stack 50 is greater than or equal to a predetermined reference output. The coolant cooling cancellation condition may be determined based on whether or not a temperature of the coolant C measured by the temperature sensor 70 is lower than a predetermined reference temperature, but is not limited thereto. For example, the coolant cooling cancellation condition may be determined based on whether or not the output of the stack 50 is less than a predetermined reference output. Here, the reference temperature and the reference output for the coolant cooling cancellation may be the same as those for the coolant cooling, but are not limited thereto.

More specifically, when the coolant cooling condition is satisfied, the controller 30 may control the opening and closing device 140 to open the second inlet 112 and the second outlet 114 and close the communication holes 116a and 116b, and control the first opening and closing valve 22 to allow a predetermined quantity of the coolant C for heat dissipation to flow into the second line 14. The quantity of the coolant C for heat dissipation may be greater than the aforementioned minimum quantity, but is not limited thereto.

In addition, when the coolant cooling condition is satisfied, the controller 30 may stop the blowing fan 130 and the PTC heater 170, and control the heat pump system to prevent the refrigerant from being supplied to the evaporator 152.

When the vehicle is controlled as described above, the second air A2 may be introduced to the second flow path 110 through the second inlet 112 and be then heat-exchanged with the coolant C passing through the heater core 160. Thus, the second air A2 may be heated by the coolant C, and the coolant C may be cooled by the second air A2. Then, the second air A2 may be discharged to the outside of the vehicle through the second outlet 114 and the exhaust line 52. The coolant C may be reintroduced to the first line 12 through the first opening and closing valve 22 and be then supplied to the stack 50.

The controller 30 may control the water injector 180 to inject water to the heater core 160. Then, the water injected by the water injector 180 may be heat-exchanged with the coolant C passing through the heater core 160. Thus, the water may be heated and evaporated, and the coolant C may be cooled using evaporation latent heat absorbed when the water is evaporated. Therefore, the coolant C may be cooled to a lower temperature, compared to when the coolant C is cooled using only the second air A2.

As described above, the fuel cell system 1 may cool the coolant C using the heater core 160 of the air conditioning system 90 as well as the radiator 60. In other words, the fuel cell system 1 may primarily cool the coolant C using the radiator 60 and secondarily cool the coolant C using the heater core 160 as an auxiliary radiator. The fuel cell system 1 having the aforementioned configuration may increase a heat dissipation area for cooling the coolant C and improve the cooling performance of the stack 50, without changing the structure of the radiator 60.

Further, the fuel cell system 1 may use the air conditioning system 90 to cool the interior of the vehicle and cool the coolant C simultaneously. In this case, the controller 30 may control the vehicle to cool the first air A1 using the evaporator 152 and cool the coolant C using the heater core 160 and the water injector 180 simultaneously, in a state in which the first flow path 100 and the second flow path 110 are isolated from each other by the first and second opening and closing doors 142 and 144.

Figure 5:
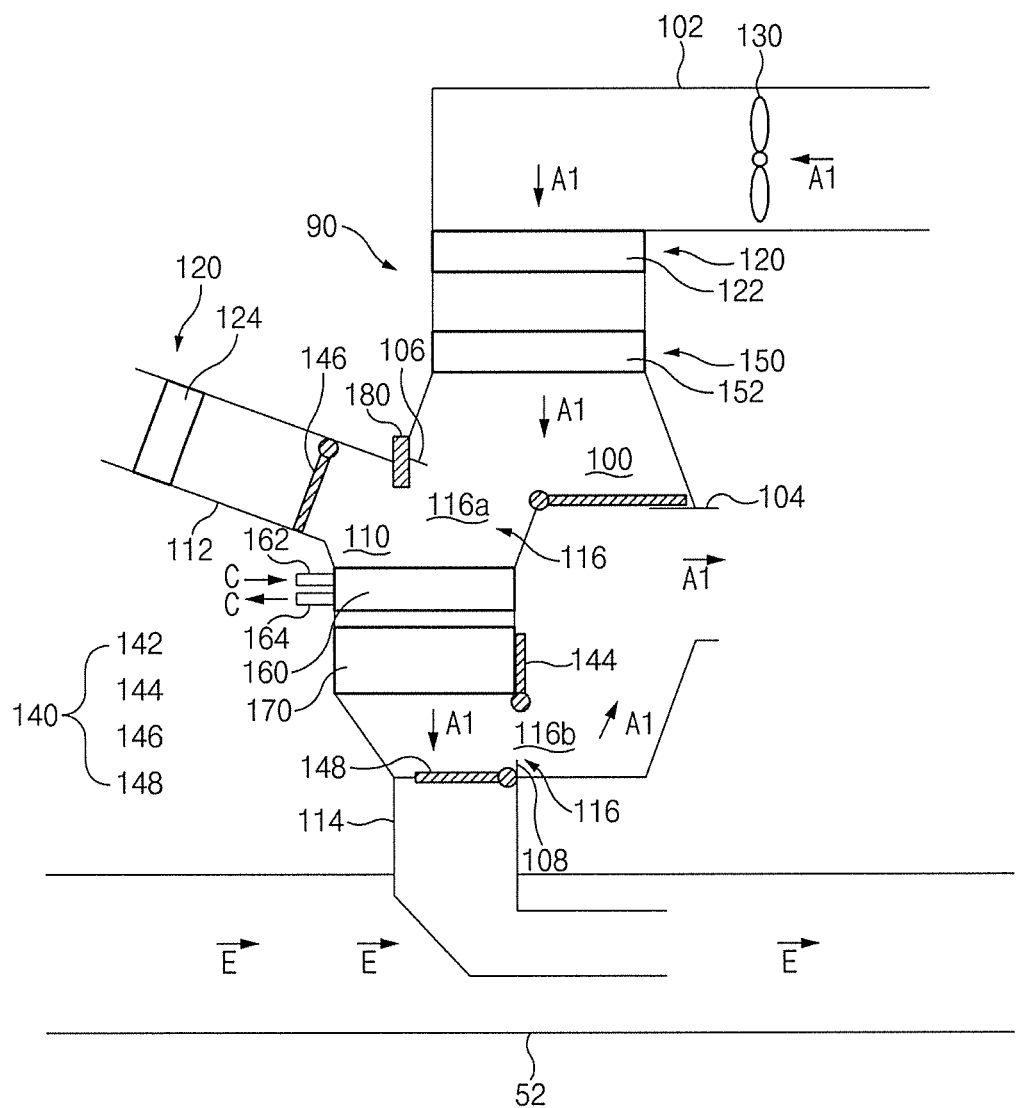
FIG. 5 illustrates a process of heating the interior of a vehicle using the air conditioning system illustrated in FIG. 1.

FIG. 5 illustrates a process of heating the interior of the vehicle using the air conditioning system illustrated in FIG. 1.

Hereinafter, referring to FIG. 5, a method for heating the interior of the vehicle using the air conditioning system 90 will be described.

When a predetermined heating condition is satisfied, the controller 30 may control the opening and closing device 140 to open the first communication hole 116a and the second communication hole 116b and close the second inlet 112 and the second outlet 114, and control the blowing fan 130 to blow the first air A1. The heating condition may be determined based on whether or not a temperature in the interior of the vehicle is lower than or equal to a predetermined heating temperature, but is not limited thereto.

In addition, when the heating condition is satisfied, the controller 30 may control the first opening and closing valve 22 to allow a predetermined quantity of the coolant C for heating to flow into the second line 14, operate the PTC heater 170, and stop the heat pump system to prevent the refrigerant from being supplied to the evaporator 152.

When the vehicle is controlled as described above, the first air A1 may be introduced to the first flow path 100 through the first inlet 102 and flow to the second flow path 110 through the first communication hole 116a. While the first air A1 is flowing through the second flow path 110, it may be heat-exchanged with the coolant C by the heater core 160 to be primarily heated, and be then secondarily heated by the PTC heater 170. The first air A1 may be reintroduced to the first flow path 100 through the second communication hole 116b, and be then supplied to the interior of the vehicle through the first outlet 104 to thereby heat the interior of the vehicle.

As illustrated in FIG. 5, the first opening and closing door 142 may have a predetermined size sufficient to close a section between the first inlet 102 and the first outlet 104. In addition, when the interior of the vehicle is heated, the controller 30 may control the first opening and closing door 142 to close the section between the first inlet 102 and the first outlet 104. In this case, since the entirety of the first air A1 flows through the second flow path 110, the first air A1 may be heated to a higher temperature, and thus the heating performance of the air conditioning system 90 may be improved.

Figure 6:
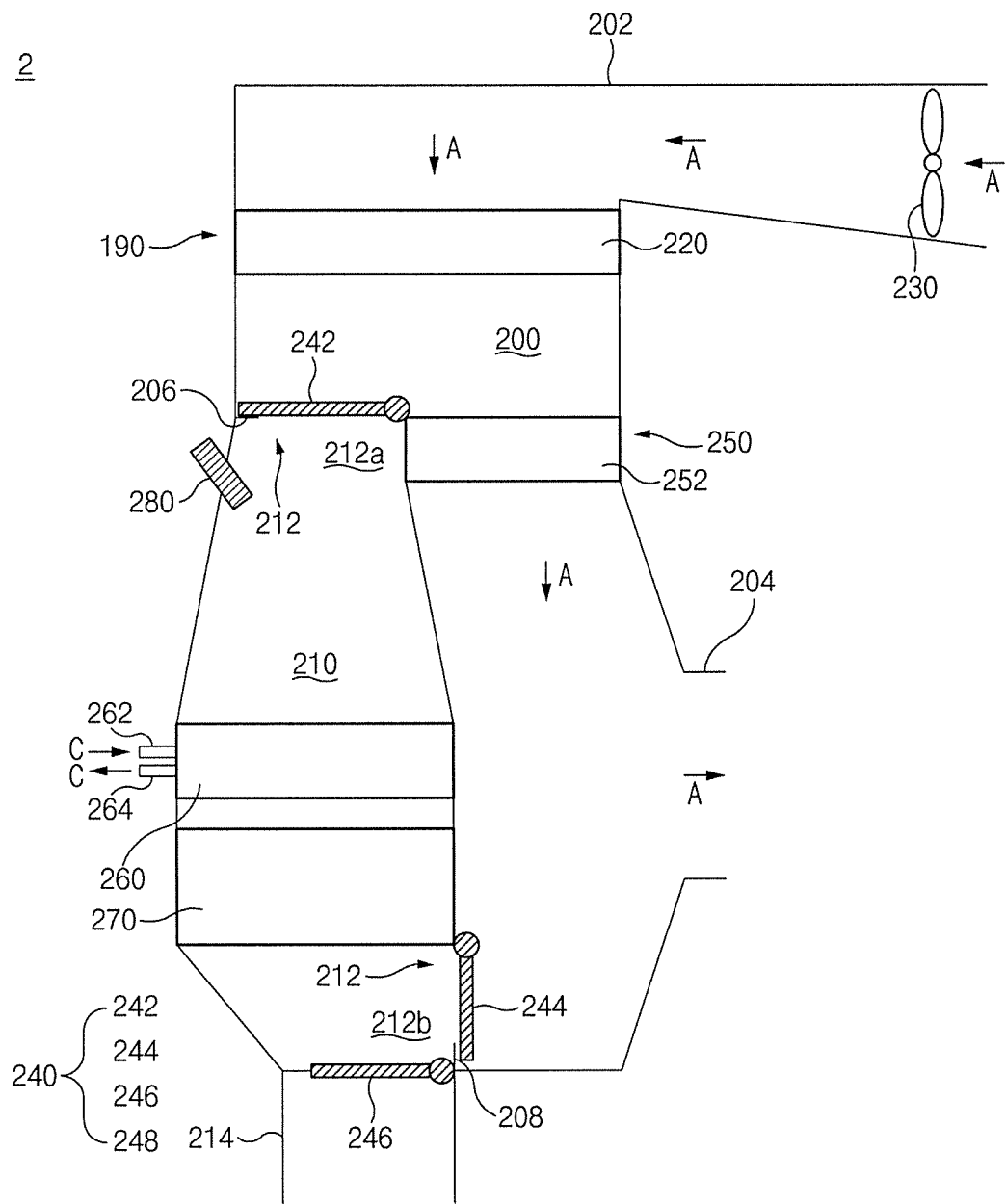
FIG. 6 illustrates a process of cooling the interior of a vehicle using an air conditioning system in a fuel cell system according to a second exemplary embodiment of the present disclosure.
Figure 7:
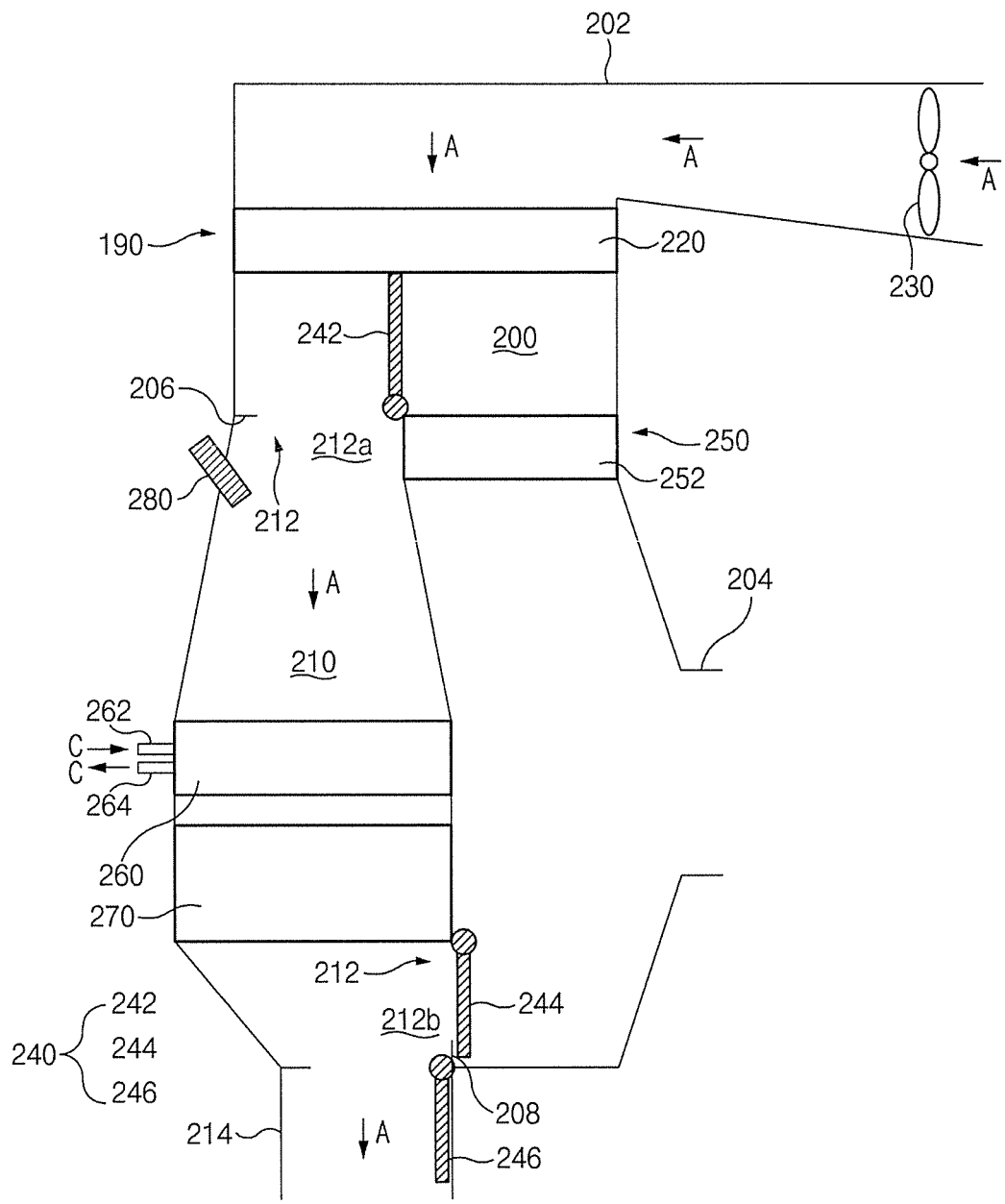
FIG. 7 illustrates a process of cooling a coolant using the air conditioning system illustrated in FIG. 6.
Figure 8:
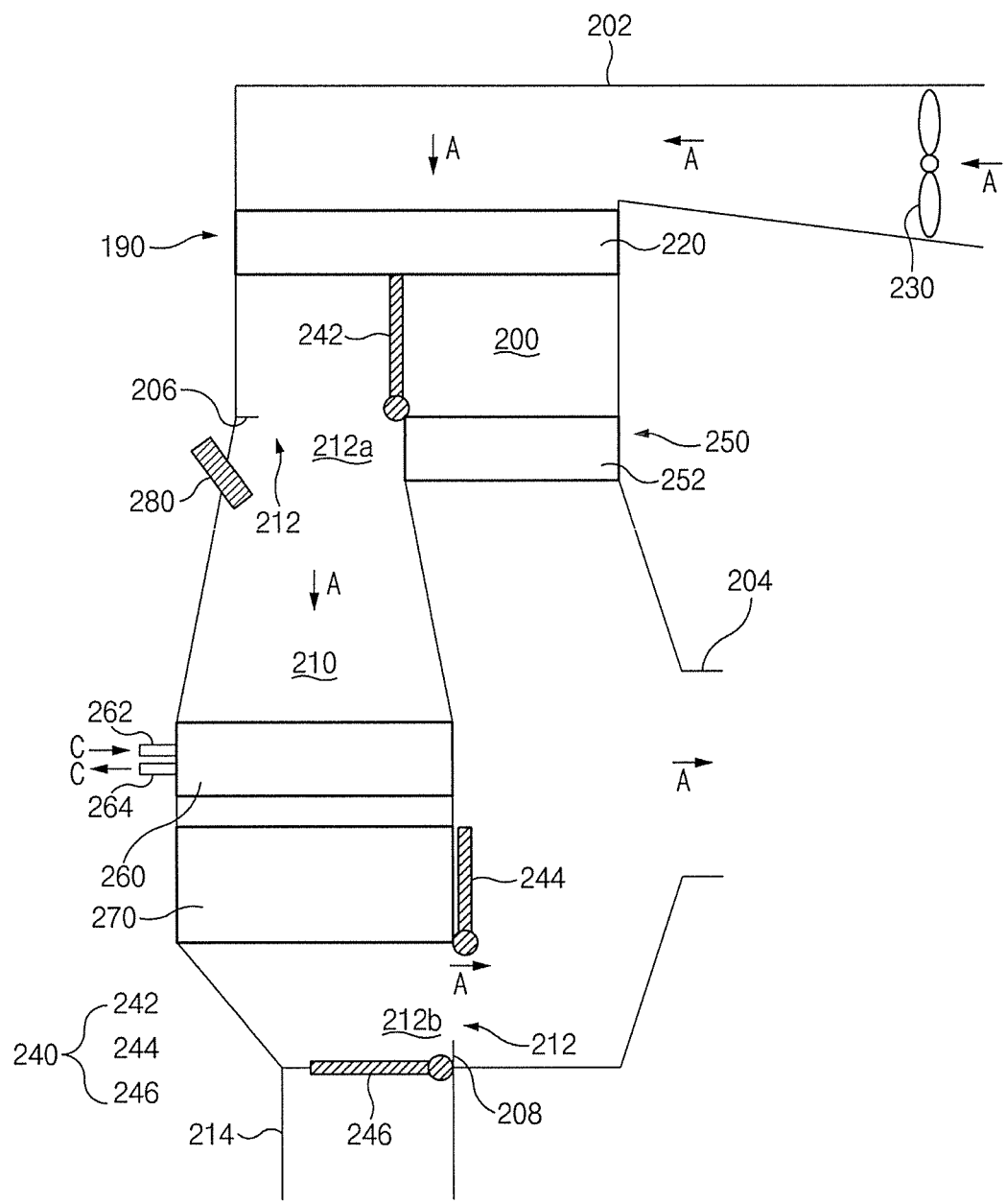
FIG. 8 illustrates a process of heating the interior of a vehicle using the air conditioning system illustrated in FIG. 6.

FIG. 6 illustrates a process of cooling the interior of a vehicle using an air conditioning system in a fuel cell system according to a second exemplary embodiment of the present disclosure. FIG. 7 illustrates a process of cooling a coolant using the air conditioning system illustrated in FIG. 6, and FIG. 8 illustrates a process of heating the interior of the vehicle using the air conditioning system illustrated in FIG. 6.

Referring to FIG. 6, a fuel cell system 2 according to the second exemplary embodiment of the present disclosure has the same configuration as that of the above-described fuel cell system 1, except that a structure of an air conditioning system 190 is changed. Hereinafter, the fuel cell system 2 will be described by focusing on the different structure of the air conditioning system 190. In addition, the same or similar reference numerals will be used to designate the same or equivalent elements of the fuel cell system 2, compared to the elements of the fuel cell system 1.

The air conditioning system 190 includes, as illustrated in FIG. 6, a first flow path 200, a second flow path 210, an air filter 220, a blowing fan 230, an opening and closing device 240, a cooler 250, a heater core 260, a PTC heater 270, and a water injector 280.

The first flow path 200 may have an inlet 202 and a first outlet 204, as illustrated in FIG. 6. The first flow path 200 may be provided with the blowing fan 230, the air filter 220, and the cooler 250.

As illustrated in FIG. 6, the inlet 202 may be provided to introduce air A. For example, the inlet 202 may communicate with the outside of the vehicle such that the air in the atmosphere may be introduced as the air A. A cross-sectional area of the inlet 202 may be gradually narrowed from the outside of the first flow path 200 to the inside of the first flow path 200. Such a structure of the inlet 202 may increase a flow rate of the air A passing through the inlet 202.

As illustrated in FIG. 6, the first outlet 204 may be provided to discharge the air A having passed through the first flow path 200. For example, the first outlet 204 may communicate with the interior of the vehicle such that the air A may be discharged into the interior of the vehicle.

The second flow path 210 may have one or more communication holes 212 and a second outlet 214, as illustrated in FIG. 7. The second flow path 210 may be provided with the heater core 260, the PTC heater 270, and the water injector 280.

Each of the communication holes 212 may be provided to communicate with the first flow path 200, as illustrated in FIG. 7. The number of communication holes is not particularly limited. For example, the communication holes 212 include a first communication hole 212a communicating with a predetermined first point 206 of the first flow path 200, and a second communication hole 212b communicating with a predetermined second point 208 of the first flow path 200 to be positioned on the downstream side of the second flow path 210 in relation to the first communication hole 212a. The air A may be transferred from the first flow path 200 to the second flow path 210 or from the second flow path 210 to the first flow path 200 through the communication holes 212.

As illustrated in FIG. 7, the second outlet 214 may be provided to discharge the air A having passed through the second flow path 210. For example, the second outlet 214 may communicate with the outside of the vehicle such that the air A having passed through the second flow path 210 may be discharged to the outside of the vehicle. The second outlet 214 may directly communicate with the outside of the vehicle, but is not limited thereto. In other words, the second outlet 214, like the second outlet 114 of the fuel cell system 1, may communicate with the exhaust line 52.

As illustrated in FIG. 6, the air filter 220 may be disposed in the first flow path 200 to filter the air A. The blowing fan 230 may be disposed in the first flow path 200 to blow the air A in a direction toward the inside of the first flow path 200. As illustrated in FIG. 6, the blowing fan 230 may be disposed on the upstream side of the first flow path 200 in relation to the air filter 220, but the position thereof is not limited thereto.

The opening and closing device 240 may be provided to switch the flow of the air A inside the air conditioning system 190. To this end, as illustrated in FIG. 6, the opening and closing device 240 may have a first opening and closing door 242 opening and closing the first communication hole 212a, a second opening and closing door 244 opening and closing the second communication hole 212b, and a third opening and closing door 246 opening and closing the second outlet 214.

As illustrated in FIG. 6, the cooler 250 may be disposed in the first flow path 200 to cool the air A. The cooler 250 includes an evaporator 252 exchanging heat between a refrigerant and the air A to cool the air A. The evaporator 252 may be disposed on the downstream side of the first flow path 200 in relation to the first point 206, but the position thereof is not limited thereto.

As illustrated in FIG. 6, the heater core 260 may be disposed in the second flow path 210 to contact the air A. The heater core 260 may have a coolant inlet 262 connected to the second line 14 to allow the coolant C circulating through the second line 14 to be introduced into the inside of the heater core 260, and a coolant outlet 264 connected to the second line 14 to discharge the coolant C that has been introduced into the inside of the heater core 260.

As illustrated in FIG. 6, the PTC heater 270 may be disposed in the second flow path 210 to heat the air A passing through the second flow path 210 using electric current supplied from a battery.

Hereinafter, referring to FIG. 6, a method for cooling the interior of the vehicle using the air conditioning system 190 will be described.

When a predetermined cooling condition is satisfied, the controller 30 may control the opening and closing device 240 to close the communication holes 212 and the second outlet 214, control the blowing fan 230 to blow the air A, and control the heat pump system to allow the refrigerant to pass through the evaporator 252.

In addition, when the cooling condition is satisfied, the controller 30 may control the first opening and closing valve 22 to allow a predetermined minimum quantity of the coolant C to flow into the second line 14, and stop the PTC heater 270 and the water injector 280.

When the vehicle is controlled as described above, the air A may be introduced into the first flow path 200 through the inlet 202 and be then cooled by the evaporator 252. The cooled air A may be supplied to the interior of the vehicle through the first outlet 204, thereby cooling the interior of the vehicle.

Hereinafter, referring to FIG. 7, a method for cooling the coolant C using the air conditioning system 190 will be described.

When a predetermined coolant cooling condition is satisfied, the controller 30 may control the opening and closing device 240 to open the first communication hole 212a and the second outlet 214 and close the second communication hole 212b, and control the first opening and closing valve 22 to allow a predetermined quantity of the coolant C for heat dissipation to flow into the second line 14.

In addition, the controller 30 may control the blowing fan 230 to blow the air A, and control the heat pump system to prevent the refrigerant from being supplied to the evaporator 252.

When the vehicle is controlled as described above, at least a portion of the air A introduced into the first flow path 200 through the inlet 202 may flow into the second flow path 210 through the first communication hole 212a, and be then heat-exchanged with the coolant C passing through the heater core 260. Thus, the air A introduced into the second flow path 210 may be heated by the coolant C, and the coolant C may be cooled by the air A introduced into the second flow path 210. Then, the air A heated by the coolant C may be discharged to the outside of the vehicle through the second outlet 214, and the coolant C cooled by the air A may be reintroduced to the first line 12 through the first opening and closing valve 22 and be then supplied to the stack 50.

The controller 30 may control the water injector 280 to inject water to the heater core 260, and thus the coolant C may also be cooled using the water injected by the water injector 280.

Hereinafter, referring to FIG. 8, a method for heating the interior of the vehicle using the air conditioning system 190 will be described.

When a predetermined heating condition is satisfied, the controller 30 may control the opening and closing device 240 to open the communication holes 212 and close the second outlet 214, and control the blowing fan 230 to blow the air A.

In addition, when the heating condition is satisfied, the controller 30 may control the first opening and closing valve 22 to allow a predetermined quantity of the coolant C for heating to flow into the second line 14, operate the PTC heater 270, and control the heat pump system to prevent the refrigerant from being supplied to the evaporator the evaporator 252.

When the vehicle is controlled as described above, the air A may flow through the second flow path 210 to be heated by the heater core 260 and the PTC heater 270, and be then supplied to the interior of the vehicle through the first outlet 204 to thereby heat the interior of the vehicle.

Figure 9:
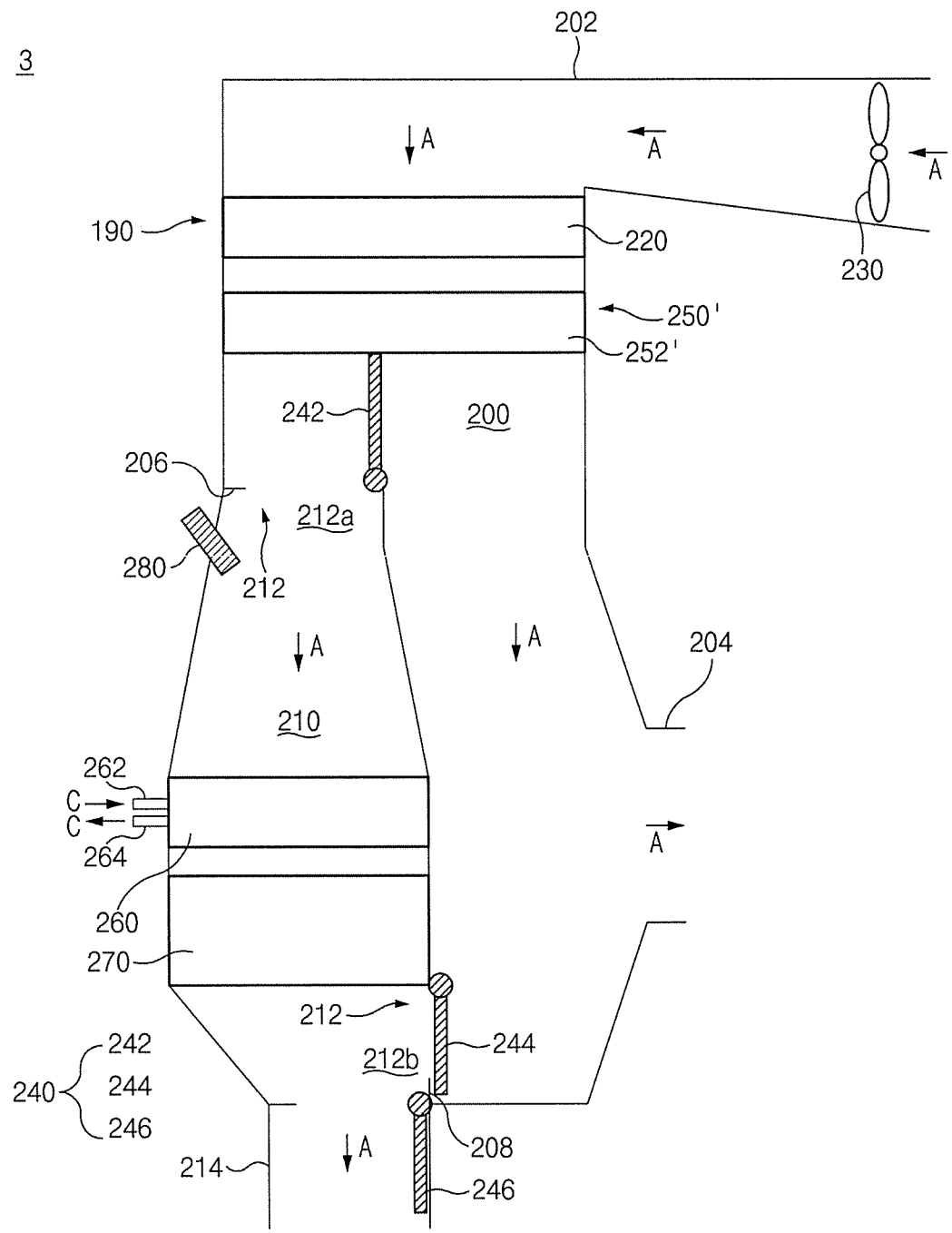
FIG. 9 illustrates a process of cooling the interior of a vehicle and cooling a coolant simultaneously using an air conditioning system in a fuel cell system according to a third exemplary embodiment of the present disclosure.

FIG. 9 illustrates the configuration of an air conditioning system in a fuel cell system according to a third exemplary embodiment of the present disclosure.

A fuel cell system 3 according to the third exemplary embodiment of the present disclosure differs from the above-described fuel cell system 2 with respect to a structure of an air conditioning system 190'. Hereinafter, the fuel cell system 3 will be described by focusing on the aforementioned difference. In addition, the same or similar reference numerals will be used to designate the same or equivalent elements of the fuel cell system 3, compared to the elements of the fuel cell system 2.

The air conditioning system 190' differs from the air conditioning system 190 of the above-described fuel cell system 2 with respect to the installation of a cooler 250'. The cooler 250' includes an evaporator 252' capable of cooling air A using a refrigerant that is circulated by the heat pump system of the vehicle. The evaporator 252' may be disposed on the upstream side of the first flow path 200 in relation to the first point 206 of the first flow path 200.

The fuel cell system 3 differs from the above-described fuel cell system 2 in that it is capable of cooling the interior of the vehicle and cooling the coolant C simultaneously.

Hereinafter, referring to FIG. 9, a method for cooling the interior of the vehicle and cooling the coolant C simultaneously using the air conditioning system 190' will be described.

When a predetermined coolant cooling condition is satisfied, the controller 30 may control the opening and closing device 240 to open the first communication hole 212a and the second outlet 214 and to close the second communication hole 212b, control the first opening and closing valve 22 to allow a predetermined quantity of the coolant C for heat dissipation to flow into the second line 14, and control the blowing fan 230 to blow the air A. Here, the coolant cooling condition may be determined based on whether or not a temperature of the coolant C measured by the temperature sensor 70 is higher than or equal to a predetermined reference temperature and whether or not a temperature in the interior of the vehicle is lower than or equal to a predetermined cooling temperature, but is not limited thereto. For example, the coolant cooling condition may be determined based on whether or not the temperature of the coolant C measured by the temperature sensor 70 is higher than or equal to a predetermined reference temperature or whether or not the output of the stack 50 is greater than or equal to a predetermined reference output.

In addition, when the coolant cooling condition is satisfied, the controller 30 may control the heat pump system to allow the refrigerant to be supplied to the evaporator 252', control the water injector 280 to inject water to the heater core 260, and stop the PTC heater 270.

When the vehicle is controlled as described above, the air A may be introduced into the first flow path 200 through the inlet 202 and be then cooled by the evaporator 252'. A portion of the air A cooled by the evaporator 252' may flow into the second flow path 210 through the first communication hole 212a and cool, together with the water injected by the water injector 280, the coolant C passing through the heater core 260. The air A used for cooling the coolant C may be discharged to the outside of the vehicle through the second outlet 214. In addition, the other portion of the air A cooled by the evaporator 252' may flow through the first flow path 200 and be supplied to the interior of the vehicle through the first outlet 204 to thereby cool the interior of the vehicle.

As described above, the fuel cell system 3 may have a structure in which the coolant C is cooled using the air A cooled by the evaporator 252'. Thus, the fuel cell system 3 may improve the heat dissipation performance of the heater core 260 and the cooling performance of the stack 50, compared to the fuel cell system 2 having a structure in which the coolant C is cooled using the air A of room temperature. However, when using the heater core 260 as an auxiliary radiator, the fuel cell system 3 may also cool the coolant C using the air A of room temperature by controlling the heat pump system to prevent the refrigerant from being supplied to the evaporator 252'.

As set forth above, the fuel cell system, according to exemplary embodiments of the present disclosure, uses the heater core as the auxiliary radiator assisting the radiator in cooling the coolant, and thus it can increase a heat dissipation area, without changing the structure of the radiator, to thereby improve the cooling performance of the stack.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell system, comprising:
   a first line provided with a fuel cell stack and allowing a coolant to be circulated therethrough; and
   a second line provided with an air conditioning system and connected to the first line to allow at least a portion of the coolant to be selectively circulated therethrough,
   wherein the air conditioning system comprises:
   a first flow path including a first inlet through which first air is introduced;
   a second flow path including a second inlet through which second air is introduced, and one or more communication holes communicating with the first flow path;
   an opening and closing device independently opening and closing the second inlet and the communication holes;
   a cooler disposed in the first flow path and cooling the air passing through the first flow path; and
   a heater core disposed in the second flow path, and
   wherein the heater core is configured to exchange heat between the coolant passing through the second line and the air passing through the second flow path in order to cool the coolant.

2. The fuel cell system according to claim 1, wherein the cooler includes an evaporator exchanging heat between a refrigerant and the air passing through the first flow path.

3. The fuel cell system according to claim 1, further comprising a controller controlling the opening and closing device,
   wherein the controller controls the opening and closing device to open the second inlet and close the communication holes to thereby allow the coolant and the second air to be heat-exchanged by the heater core when the predetermined coolant cooling condition is satisfied.

4. The fuel cell system according to claim 3, wherein the first flow path further includes a first outlet through which the air passing through the first flow path is discharged,
   the second flow path further includes a second outlet through which the air passing through the second flow path is discharged, and
   the opening and closing device is provided to open and close the second outlet.

5. The fuel cell system according to claim 4, wherein the first outlet communicates with an interior of a vehicle,
   the second outlet communicates with the outside of the vehicle, and
   the controller controls the opening and closing device to open the second outlet to thereby allow the second air that is heat-exchanged with the coolant to be discharged to the outside of the vehicle through the second outlet when the coolant cooling condition is satisfied.

6. The fuel cell system according to claim 5, further comprising an exhaust line guiding gas discharged from the fuel cell stack to the outside of the vehicle,
   wherein the second outlet communicates with the exhaust line.

7. The fuel cell system according to claim 3, wherein the coolant cooling condition is determined based on whether or not a temperature of the coolant is higher than or equal to a predetermined reference temperature.

8. The fuel cell system according to claim 4, wherein the communication holes comprise a first communication hole communicating with a predetermined first point of the first flow path, and a second communication hole communicating with a predetermined second point of the first flow path to be positioned on a downstream side of the second flow path in relation to the first communication hole, and
   the heater core is disposed between the first communication hole and the second communication hole.

9. The fuel cell system according to claim 8, wherein the opening and closing device comprises a first opening and closing door opening and closing the first communication hole, a second opening and closing door opening and closing the second communication hole, a third opening and closing door opening and closing the second inlet, and a fourth opening and closing door opening and closing the second outlet.

10. The fuel cell system according to claim 1, wherein the air conditioning system further comprises a water injector injecting water to the heater core.

11. The fuel cell system according to claim 1, wherein the air conditioning system further comprises at least one air filter disposed in at least one of the first inlet and the second inlet.

12. A fuel cell system, comprising:
    a first line provided with a fuel cell stack and allowing a coolant to be circulated therethrough; and
    a second line provided with an air conditioning system and connected to the first line to allow at least a portion of the coolant to be selectively circulated therethrough,
    wherein the air conditioning system comprises:
    a first flow path including an inlet through which air is introduced, and a first outlet through which the air is discharged;
    a second flow path including one or more communication holes communicating with the first flow path to allow the air to pass therethrough, and a second outlet through which the air is discharged;

an opening and closing device independently opening and closing the communication holes and the second outlet;

a cooler disposed in the first flow path and cooling the air; and a heater core disposed in the second flow path, and wherein the heater core is configured to exchange heat between the coolant passing through the second line and the air in order to cool the coolant.

13. The fuel cell system according to claim 12, wherein the communication holes comprise a first communication hole communicating with a predetermined first point of the first flow path, and a second communication hole communicating with a predetermined second point of the first flow path to be positioned on a downstream side of the second flow path in relation to the first communication hole, and the heater core is disposed between the first communication hole and the second communication hole.

14. The fuel cell system according to claim 13, wherein the cooler is positioned on an upstream side of the first flow path in relation to the first point.

15. The fuel cell system according to claim 13, wherein the opening and closing device comprises a first opening and closing door opening and closing the first communication hole, a second opening and closing door opening and closing the second communication hole, and a third opening and closing door opening and closing the second outlet.

16. The fuel cell system according to claim 13, wherein the first outlet communicates with an interior of a vehicle, and the second outlet communicates with the outside of the vehicle.

17. The fuel cell system according to claim 16, further comprising a controller controlling the opening and closing device, wherein the controller controls the opening and closing device to open the first communication hole and the second outlet and close the second communication hole to thereby allow the air and the coolant to be heat-exchanged by the heater core when the predetermined coolant cooling condition is satisfied.

18. The fuel cell system according to claim 17, wherein the coolant cooling condition is determined based on whether or not a temperature of the coolant is higher than or equal to a predetermined reference temperature.

19. The fuel cell system according to claim 12, wherein the air conditioning system further comprises a blowing fan disposed in the inlet and blowing the air in a direction toward the inside of the first flow path.

20. The fuel cell system according to claim 13, wherein a cross-sectional area of the inlet is gradually narrowed from the outside of the first flow path to the inside thereof.

* * * * *